(12) United States Patent
Ueda et al.

(10) Patent No.: US 7,385,006 B2
(45) Date of Patent: Jun. 10, 2008

(54) REACTIVE MODIFIER

(75) Inventors: Kazuhiko Ueda, Kobe (JP); Shintaro Komitsu, Takasago (JP)

(73) Assignee: Kaneka Corporation, Osaka (JP)

( * ) Notice: Subject to any disclaimer, the term of this patent is extended or adjusted under 35 U.S.C. 154(b) by 251 days.

(21) Appl. No.: 10/552,740

(22) PCT Filed: Apr. 16, 2004

(86) PCT No.: PCT/JP2004/005516

§ 371 (c)(1),
(2), (4) Date: Oct. 12, 2005

(87) PCT Pub. No.: WO2004/096875

PCT Pub. Date: Nov. 11, 2004

(65) Prior Publication Data

US 2006/0199918 A1    Sep. 7, 2006

(30) Foreign Application Priority Data

Apr. 25, 2003 (JP) .............................. 2003-122951

(51) Int. Cl.
C08L 71/00 (2006.01)
(52) U.S. Cl. ...................................... 525/100; 525/477
(58) Field of Classification Search ...................... None
See application file for complete search history.

(56) References Cited

U.S. PATENT DOCUMENTS

| | | | |
|---|---|---|---|
| 5,109,064 A | 4/1992 | Wakabayashi et al. | |
| 5,650,467 A | 7/1997 | Suzuki et al. | |
| 6,350,345 B1 * | 2/2002 | Kotani et al. | 156/329 |
| 6,914,110 B2 * | 7/2005 | Tsuji et al. | 526/222 |
| 7,144,953 B2 * | 12/2006 | Ueda et al. | 525/100 |
| 7,297,743 B2 * | 11/2007 | Kanamori et al. | 524/523 |
| 2002/0045683 A1 * | 4/2002 | Kiyohara et al. | 523/440 |
| 2002/0051889 A1 * | 5/2002 | Kanamori et al. | 428/447 |
| 2002/0146573 A1 * | 10/2002 | Shimada et al. | 428/447 |
| 2005/0004327 A1 * | 1/2005 | Ueda et al. | 525/477 |

FOREIGN PATENT DOCUMENTS

| | | | |
|---|---|---|---|
| EP | 0 897 404 B1 | | 2/1999 |
| EP | 1 256 611 A2 | | 11/2002 |
| EP | 1 445 283 A1 | | 8/2004 |
| JP | 63-112642 A | | 5/1988 |
| JP | 6-57208 A | | 3/1994 |
| JP | 7-258535 A | | 10/1995 |
| JP | 9-302308 A | | 11/1997 |
| WO | WO 02/085985 | * | 10/2002 |
| WO | WO 03/035755 | * | 5/2003 |
| WO | WO 03/035755 A1 | | 5/2003 |

* cited by examiner

*Primary Examiner*—Marc S. Zimmer
(74) *Attorney, Agent, or Firm*—Sughrue Mion, PLLC

(57) ABSTRACT

The present invention is a reactive modifier which is an acrylic polymer having a number average molecular weight of 5000 or more, obtained by copolymerizing (A) a hydrolyzable silyl group-containing monomer, (B) methyl methacrylate, (C) butyl acrylate and (D) an alkyl (meth)acrylate in which the alkyl chain has 7 to 9 carbon atoms, wherein the content of the component A is 0.01 to 10 parts by weight, the content of the component B is 5 to 95 parts by weight, the content of the component C is 5 to 95 parts by weight, the content of the component D is 5 to 95 parts by weight, the total content of the components A to D is 50 to 100 parts by weight and the weight ratio of the component C to the component D is 0.5 to 2.0. The present invention provides a reactive modifier which is inexpensive in the raw materials thereof, easy to handle and excellent in the storage stability as observed at the time of mixing with a polymer.

3 Claims, No Drawings

REACTIVE MODIFIER

RELATED APPLICATION

This application is a national stage of PCT application PCT/JP2004/005516 filed on Apr. 16, 2004, claiming priority based on Japanese Application No. 2003-122951filed on Apr. 25, 2003, the contents of which are incorporated herein by reference in their entirety.

TECHNICAL FIELD

The present invention relates to a reactive modifier for a curable composition, particularly, a reactive modifier for an oxyalkylene polymer which contains silicon-containing functional groups capable of cross-linking by forming siloxane bonds through condensation (hereinafter, also referred to as hydrolyzable silyl groups), and to a room temperature-curable composition, including the modifier, excellent in storage stability. In the present invention, analkyl (meth)acrylate means an alkyl acrylate and/or an alkyl methacrylate.

BACKGROUND ART

Methods in which hydrolyzable silyl group-containing (meth)acrylate polymers are used as modifiers for hydrolyzable silyl group-containing oxyalkylene polymers are proposed in Patent Documents 1 to 4.

Among these methods, the method disclosed in Patent Document 3 in which a copolymer containing a long-chain alkyl (meth)acrylate is blended is excellent from the viewpoints of transparency, tensile strength and other various practical properties. However, in the method in which a copolymer containing a long-chain alkyl (meth)acrylate is blended, there are problems that a long-chain alkyl (meth) acrylate monomer as raw material is generally expensive and is not easy to handle because it is solid at normal temperature. Also, when two or more alkyl (meth)acrylates are copolymerized, it is generally necessary to cool the monomer units mixed together in advance for the sake of safety; however, in the case where along-chain alkyl (meth) acrylate monomer is among the monomers used, there is a problem that it is unfavorably segregated when mixed with the cooled other monomers.

Patent Document 1: Japanese Patent Laid-Open No. 59-122541

Patent Document2: Japanese Patent Laid-Open No.60-31556

Patent Document 3: Japanese Patent Laid-Open No. 63-112642

Patent Document 4: Japanese Patent Laid-Open No.6-172631

DISCLOSURE OF THE INVENTION

An object of the present invention is to develop a reactive modifier which is inexpensive and favorable in handling of the raw materials thereof, and can provide a curable composition capable of exhibiting excellent storage stability and excellent mechanical properties.

The present inventors have achieved the present invention by finding that even when, in a hydrolyzable silyl group-containing alkyl (meth)acrylate polymer, an alkyl (meth) acrylate containing an alkyl group having 7 to 9 carbon atoms is used in a specific amount as a copolymerization component, instead of along-chain alkyl (meth)acrylate, there is obtained a reactive modifier for a hydrolyzable silyl group-containing polymer composition having a sufficient storage stability and being excellent in various practical properties.

More specifically, the reactive modifier of the present invention is a hydrolyzable silyl group-containing acrylic polymer having a number average molecular weight of 5000 or more which is obtained by copolymerizing the following monomer components A to D, the reactive modifier being characterized in that the content of the component A is 0.01 to 10 parts by weight, the content of the component B is 5 to 95 parts by weight, the content of the component C is 5 to 95 parts by weight, the content of the component D is 5 to 95 parts by weight, the total content of the components A to D is 50 to 100 parts by weight, and the weight ratio of the component C to the component D is 0.5 to 2.0.

(A) At least one monomer selected from the group consisting of a hydrolyzable silyl group-containing monomer and a monomer having a functional group capable of undergoing introduction of a hydrolyzable silyl group.

(B) Methyl methacrylate.

(C) Butyl acrylate.

(D) An alkyl (meth)acrylate in which the alkyl chain has 7 to 9 carbon atoms.

The above (A) is preferably a hydrolyzable silyl group-containing monomer.

Also, the reactive modifier of the present invention is particularly preferable as a modifier for a hydrolyzable silyl group-containing oxyalkylene polymer. Accordingly, the present invention provides a room temperature-curable resin composition including, as indispensable components, a hydrolyzable silyl group-containing oxyalkylene polymer, the aforementioned reactive modifier of the present invention and a curing accelerator.

BEST MODE FOR CARRYING OUT THE INVENTION

The present invention will be described below in detail.

The hydrolyzable silyl group is characterized in that it is capable of cross-linking even at room temperature by forming siloxane bonds. A typical example of the hydrolyzable silyl group introduced by the component (A) into the reactive modifier of the present invention is represented by the general formula (1):

$$-Si(R^1{}_{3-a})X_a \qquad (1)$$

wherein $R^1$ represents an alkyl group having 1 to 20 carbon atoms, an aryl group having 6 to 20 carbon atoms, an aralkyl group having 7 to 20 carbon atoms, or a triorganosiloxy group represented by $(R')_3SiO-$; wherein R' is a monovalent hydrocarbon group having 1 to 20 carbon atoms, the three R's may be the same or different; X represents a hydroxy group or a hydrolyzable group, and when two or more Xs are present, they may be the same or different; and a represents 1, 2 or 3.

From the viewpoints of economic efficiency, handling easiness and the like, the specific example of the hydrolyzable silyl group in the component (A) is preferably at least one selected from the group consisting of a dimethylmonomethoxysilyl group, a methyldimethoxysilyl group, a trimethoxysilyl group, an ethyldiethoxysilyl group, a triethoxysilyl group, a methyldiisopropenyloxysilyl group and a triisopropenyloxysilyl group.

The alkyl (meth)acrylate monomer, as the component (D) in the present invention, containing an alkyl group having 7 to 9 carbon atoms is represented by the general formula (2):

$$CH_2=C(R^2)COOR^3 \qquad (2)$$

wherein $R^2$ represents a hydrogen atom or a methyl group, and $R^3$ represents an alkyl group having 7 to 9 carbon atoms. Examples of $R^3$ may include alkyl groups such as an n-heptyl group, an isoheptyl group, an n-octyl group, a 2-ethylhexyl group, an isooctyl group, an n-nonyl group and an isononyl group. However, a 2-ethylhexyl group and an isononyl group are particularly preferable from the viewpoints of the availability of the raw materials and the economic efficiency. The monomers represented by the general formula (2) may be used as the component (D) each alone or in combinations of two or more thereof.

For the purpose of attaining sufficient performance as are active modifier, it is necessary that the reactive modifier be sufficiently compatible with the polymer to be modified and the viscosity of the mixture composed of the reactive modifier and the polymer to be modified be appropriate.

Methyl methacrylate as the component (B) and butyl acrylate as the component (C) in the present invention are relatively inexpensive and easily available monomers, which are copolymerized in combination with the component (D) to permit attaining a sufficient degree of polymerization. It is also possible to adjust the Tg of the reactive modifier in such a way that the Tg meets the purpose of ensuring the sufficient compatibility of the reactive modifier with various polymers and the purpose of obtaining appropriate viscosities of the mixtures of the reactive modifier with various polymers.

The number of the hydrolyzable silyl groups in one molecule of the reactive modifier in the present invention is, on average, preferably one or more, more preferably 1.1 or more, and particularly preferably 1.5 or more because it is desirable that a sufficient curability is attained and the reactive modifier, for the purpose of displaying sufficient performance as reactive modifier, undergoes co-cross-linking with the polymer to be modified.

The reactive modifier having a number average molecular weight of 5,000 to 100,000, as measured by the GPC method relative to polystyrene standards, is preferable from the viewpoints of the handling easiness, the possibility of obtaining a sufficient compatibility with the polymer to be modified and the possibility of reducing the used amount of the expensive hydrolyzable silyl group-containing monomer. The number average molecular weight of the reactive modifier is more preferably 5,000 to 50,000, and particularly preferably 7,000 to 30,000. When the number average molecular weight of the reactive modifier is less than 5,000, a satisfactory rubber elastic substance is hardly obtainable, and a disadvantage in cost is caused by the inevitable increase of the used amount of the component (A), namely, the hydrolyzable silyl group-containing monomer or the monomer containing a functional group capable of undergoing introduction of a hydrolyzable silyl group for the purpose of meeting the above described range of the number of the hydrolyzable silyl groups in one molecule of the reactive modifier. When the number average molecular weight of the reactive modifier exceeds 100,000, there is a fear that its viscosity becomes high to make the handling thereof difficult.

The reactive modifier of the present invention is obtained by vinyl polymerization, for example, a radical reaction-based vinyl polymerization of the monomers (A), (B), (C) and (D), and more specifically, by usual polymerization methods such as a solution polymerization method and a mass polymerization method. The polymerization concerned can be carried out by adding a radical initiator to these monomers according to need at a reaction temperature of 50 to 150° C. A solvent may be used or may not be used. When a solvent is used, it is preferable to use a non-reactive solvent selected form the solvents such as ethers, hydrocarbons, acetates and alcohols from the viewpoints that these solvents are inexpensive and meet the safety of the polymerization reaction. From an environmental viewpoint, it is preferable to use non-aromatic solvents. As non-aromatic solvents, alcohols such as butanol lead to preferable results from the viewpoints of environmental effects and the handling easiness of the obtained polymers.

Various methods are available as the method for introducing the hydrolyzable silyl groups into the reactive modifier in the present invention. Examples of such methods may include the following methods.

(1) A method in which a compound (for example, $CH_2=CHSi(OCH_3)_3$) having a polymerizable unsaturated bond and a hydrolyzable silyl group is added to a mixture of the monomers (B), (C) and (D) to be copolymerized with each other.

(2) A method in which a compound (for example, acrylic acid) having a polymerizable unsaturated bond and a reactive functional group (hereinafter referred to as a Z group) is added to a mixture of the monomers (B), (C) and (D) to be copolymerized with each other, and thereafter the produced copolymer is reacted with a compound (for example, a compound having an isocyanate group and a —$Si(OCH_3)_3$ group) having a hydrolyzable silyl group and a functional group (hereinafter referred to as a Z' group) capable of reacting with the Z group to introduce the hydrolyzable silyl group into the copolymer.

Specific examples of the compound used in the above described method (1) may include: $CH_2=CHSi(CH_3)(OCH_3)_2$, $CH_2=CHSi(CH_3)Cl_2$, $CH_2=CHSi(OCH_3)_3$, $CH_2=CHSiCl_3$, $CH_2=CHCOO(CH_2)_2Si(CH_3)(OCH_3)_2$, $CH_2=CHCOO(CH_2)_2Si(OCH_3)_3$, $CH_2=CHCOO(CH_2)_2Si(CH_3)Cl_2$, $CH_2=CHCOO(CH_2)_2SiCl_3$, $CH_2=C(CH_3)COO(CH_2)_2Si(CH_3)(OCH_3)_2$, $CH_2=C(CH_3)COO(CH_2)_2Si(OCH_3)_3$, $CH_2=C(CH_3)COO(CH_2)_3Si(CH_3)(OCH_3)_2$, $CH_2=C(CH_3)COO(CH_2)_3Si(OCH_3)_3$, $CH_2=C(CH_3)COO(CH_2)_2Si(CH_3)C$ $CH_2=C(CH_3)COO(CH_2)_2SiCl_3$, $CH_2=CHCH_2OC(O)$—Ph—$COO(CH_2)_3Si(CH_3)(OCH_3)_2$, $CH_2=CHCH_2OC(O)$—Ph—$COO(CH_2)_3Si(OCH_3)_3$, $CH_2=CHCH_2OC(O)$—Ph—$COO(CH_2)_3Si(CH_3)Cl_2$, and $CH_2=CHCH_2OC(O)$—Ph—$COO(CH_2)_3SiCl_3$. Herein, Ph represents a p-phenylene group. Among these compounds, $CH_2=CHSi(OCH_3)_3$, $CH_2=C(CH_3)COO(CH_2)_3Si(CH_3)(OCH_3)_2$ and $CH_2=C(CH_3)COO(CH_2)_3Si(OCH_3)_3$ are preferable from the viewpoints of the economic efficiency and the reactivity of the curable composition to be obtained.

These silane compounds are synthesized by various methods, such as a method in which acetylene, allyl acrylate, allyl methacrylate, diallyl phthalate or the like is reacted with methyldimethoxysilane, methyl dichlorsilane or the like in the presence of group VIII transition metal catalysts. As such transition metal complex catalysts, those complex compounds of the group VIII transition metals selected from the group consisting of platinum, rhodium, cobalt, palladium and nickel are effectively used. Particularly effective are platinum black and platinum compounds such as chloroplatinic acid, platinum-alcohol compounds, platinum-olefin complexes, platinum-aldehyde complexes and platinum-ketone complexes.

As for the compounds used in the method (2), examples of the Z group and the Z' group may include various combinations of groups, among which is an example in which the Z group is a vinyl group and the Z' group is a hydrosilicon group (H—Si). The Z group and the Z' group can be combined through hydrosilylation reaction. Examples of the compound which has a vinyl group as the Z group and further has a polymerizable unsaturated bond may include allyl acrylate and allyl methacrylate. Specific examples of the hydrosilane compound which is a compound having a hydrosilicon group as the Z' group and further having a hydrolyzable silyl group may include: alkoxysilanes such as trimethoxysilane, triethoxysilane, methyldiethoxysilane, methyldimethoxysilane, dimethylmethoxysilane and phenyldimethoxysilane; acyloxysilanes such as methyldiacetoxysilane and trimethylsiloxymethylacetoxysilane; ketoximatesilanes such as bis(dimethylketoximate)methylsilane, bis(cyclohexylketoximate)methylsilane and bis(diethylketoximate)trimethylsiloxysilane; hydrosilanes such as dimethylsilane, trimethylsiloxymethylsilane and 1,1-dimethyl-2,2-dimethyldisiloxane; and alkenyloxysilanes such as methyltri(isopropenyloxy)silane and dimethyltri(isopropenyloxy)silane. However, the above mentioned hydrosilane compound is not limited to these examples.

No particular constraint is imposed on the hydrolyzable silyl groups contained in the hydrolyzable silyl group-containing oxyalkylene polymer used in the present invention; however, typical examples of such hydrolyzable silyl groups may include the groups represented by the general formula (3):

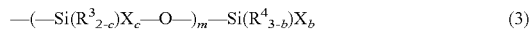
—(—Si(R$^3_{2-c}$)X$_c$—O—)$_m$—Si(R$^4_{3-b}$)X$_b$ (3)

wherein R$^3$ and R$^4$ each represent an alkyl group having 1 to 20 carbon atoms, an aryl group having 6 to 20 carbon atoms, an aralkyl group having 7 to 20 carbon atoms or a triorganosiloxy group represented by (R')$_3$SiO—; when two or more R$^1$s or R$^2$s are present, they may be the same or different; wherein R' is a monovalent hydrocarbon group having 1 to 20 carbon atoms, and 3 R's may be the same or different; X represents a hydroxy group or a hydrolyzable group, and when two or more Xs are present, they may be the same or different; b represents 0, 1, 2 or 3; c represents 0, 1 or 2; and the c-values in the m expressions each represented by the general formula (3) may be the same or different:

—Si(R$^3_{2-c}$)X$_c$—O— (4);

and m represents an integer of 0 to 19, with the proviso that b+Σc≧1 is satisfied.

No particular constraint is imposed on the hydrolyzable group represented by the above described X, and any hydrolyzable groups well known in the art may be suitably used. Specific examples of the hydrolyzable group may include: a hydrogen atom, a halogen atom, an alkoxy group, an acyloxy group, a ketoximate group, an amino group, an amide group, an acid amide group, an aminooxy group, a mercapto group and an alkenyloxy group. Among these, a hydrogen atom, an alkoxy group, an acyloxy group, a ketoximate group, an amino group, an amide group, an aminooxy group, a mercapto group and an alkenyloxy group are preferable from the viewpoints of the environmental consideration and easy availability of the raw materials involved, alkoxy groups such as a methoxy group being particularly preferable because of the moderate hydrolyzability and handling easiness.

To one silicon atom, 1 to 3 hydrolyzable and hydroxy groups can be bonded, and (b+Σc) preferably falls within a range from 1 to 5. When two or more hydrolyzable and/or hydroxy groups are present in a reactive silicon, those groups may be the same or different. In the reactive silicon, one silicon atom may be present, or two or more silicon atoms may be present; in the case of a hydrolyzable silyl group having silicon atoms combined with each other through siloxane bonds or the like, about 20 silicon atoms may be present. No particular constraint is imposed on the hydrolyzable silicon group; however, in consideration of the balance between the high hydrolysis activity and the moderate hydrolyzability combined with the handling easiness, the hydrolyzable silicon group is preferably at least one selected from the group consisting of a dimethylmonomethoxysilyl group, a methyldimethoxysilyl group, a trimethoxysilyl group, an ethyldiethoxysilyl group, a triethoxysilyl group, a methyldiisopropenyloxysilyl group and a triisopropenyloxysilyl group.

In one molecule of the oxyalkylene polymer, preferably at least one hydrolyzable silyl group is present, and more preferably about 1.1 to 5 hydrolyzable silyl groups are present. When the number of the hydrolyzable silyl groups contained in one molecule of the polymer is less than one, unpreferably the curability becomes insufficient and a satisfactory rubber elasticity is hardly attainable. When the number of the hydrolyzable silyl groups exceeds 5, unpreferably the cured articles become too hard. The hydrolyzable silyl groups may be present at the terminals or in an interior portion of the molecular chain of the oxyalkylene polymer. When the hydrolyzable silyl groups are present at the terminals of the molecular chain, the content of the effective network chain in the oxyalkylene polymer component contained in a finally formed cured article is increased, so that it preferably becomes easier to obtain a rubber-like cured article exhibiting a high strength, a high elongation and a low elastic modulus.

Examples of the oxyalkylene polymer may include oxyethylene, oxypropylene, oxybutylene, oxyisobutylene and oxytetramethylene. However, the oxyalkylene is not limited to these examples. The molecular chain of the oxyalkylene polymer may be formed of one type of repeating unit or two or more types of repeating units. The oxyalkylene polymer may also be a straight chain, a branched chain or an admixture of straight chains and branched chains. Among these oxyalkylenes, preferable is the one which has a molecular chain substantially including a repeating unit represented by the general formula (5):

—CH(CH$_3$)CH$_2$—O— (5)

from the viewpoints of the handling easiness of the obtained curable composition and the physical properties of the cured articles. The term "substantially" as referred to herein means that the repeating unit represented by the general formula (5) is present in the polymer in a content of 50 wt % or more, preferably 80 wt % or more, wherein other monomers or the like may be present.

The number average molecular weight (Mn) of the oxyalkylene polymer is preferably 6,000 to 60,000 as measured by the gel permeation chromatography (GPC) method relative to polystyrene standards, more preferably 8,000 to 50,000 from the viewpoints of the curability and handling easiness, and particularly preferably 10,000 to 30,000 from the viewpoint of the excellent mechanical properties. The ratio of the weight average molecular weight to the number average molecular weight, (Mw/Mn), is preferably as narrow in molecular weight distribution (small in the ratio Mw/Mn) as 1.6 or less, more preferably 1.5 or less, and particularly preferably 1.4 or less. When the oxyalkylene polymer having such a narrow molecular weight distribution is mixed with the reactive modifier of the present invention to prepare a curable composition, the curable composition preferably has a low viscosity to attain a satisfactory workability as compared to the case where an oxyalkylene polymer having a wide molecular weight distribution is used.

The hydrolyzable silyl group-containing oxyalkylene polymer of the present invention may be obtained, for example, by introducing hydrolyzable silyl groups into an oxyalkylene polymer having functional groups.

The introduction of the hydrolyzable silyl groups may be carried out on the basis of methods well known in the art. More specifically, the following methods may be cited.

<1> An oxyalkylene polymer having functional groups such as hydroxy groups at the terminals thereof is reacted with an organic compound having an active group capable of reacting with the functional groups and an unsaturated group, and then the obtained reaction product is reacted with a hydrosilane having a hydrolyzable group to carry out hydrosilylation.

<2> An oxyalkylene polymer having functional groups (hereinafter referred to as functional groups Y) such as hydroxy group, an epoxy group and an isocyanate group at the terminals thereof is reacted with a compound having a functional group (hereinafter referred to as a functional group Y') capable of reacting with the functional groups Y and also having a hydrolyzable silyl group. Specific examples of the silicon compound having the functional group Y' may include: amino group-containing silanes such as γ-(2-aminoethyl)aminopropyltrimethoxysilane, γ-(2-aminoethyl)aminopropylmethyldimethoxysilane and γ-aminopropyltriethoxysilane; mercapto group-containing silanes such as γ-mercaptopropyltrimethoxysilane and γ-mercaptopropylmethyldimethoxysilane; epoxy silanes such as γ-glycidoxypropyltrimethoxysilane and β-(3,4-epoxycyclohexyl)ethyltrimethoxysilane; vinylic unsaturated group-containing silane groups such as vinyltriethoxysilane, γ-methacryloyloxypropyltrimethoxysilane and γ-acryloyloxypropylmethyldimethoxysilane; chlorine atom-containing silanes such as γ-chloropropyltrimethoxysilane; isocyanate-containing silanes such as γ-isocyanatepropyltriethoxysilane and γ-isocyanatepropylmethyldimethoxysilane; and hydrosilanes such as methyldimethoxysilane, trimethoxysilane and methyldiethoxysilane. However, the silicon compound having the functional group Y' is not limited to these examples.

In the above methods, preferable is the method <1> or <2> in which a polymer having hydroxy groups at the terminals thereof is reacted with a compound having an isocyanate group and a hydrolyzable silyl group, from the viewpoints of the reaction easiness and the availability of the raw materials.

Because the molecular weight distribution of a polymer tends to be broadened when hydrolyzable silyl groups are introduced as compared to the molecular weight distribution of the polymer before introduction of such silyl groups, it is preferable that the molecular weight distribution of the polymer before the introduction of the hydrolyzable silyl groups is as narrow as possible.

Oxyalkylene polymers each having a high molecular weight and a narrow molecular weight distribution may be obtained, for example, by the methods disclosed in Japanese Patent Laid-Open Nos. 61-197631, 61-215622, 61-215623 and 61-218632; Japanese Patent Publication Nos. 46-27250 and 59-15336; and Japanese Patent Laid-Open Nos. 50-149797, 61-197631, 2-276821, 10-273512, 10-36499, 11-106500, 11-302371 and the like.

Among these, for the purpose of easily obtaining a polymer having a narrow molecular weight distribution, preferable is a polymer which is obtained by polymerizing an alkylene oxide in the presence of an initiator by use of a compound selected from the group consisting of a composite metal cyanide complex, a cesium compound and a P=N bond-containing compound as a catalyst.

As the initiator, usable are dihydric alcohols and polyhydric alcohols such as ethylene glycol, propylene glycol, butanediol, hexamethylene glycol, methallyl alcohol, hydrogenated bisphenol A, neopentyl glycol, polybutadiene diol, diethylene glycol, triethylene glycol, polyethylene glycol, dipropylene glycol, glycerin, trimethylolmethane, trimethylolpropane, pentaerythritol and the like; and various oligomers having hydroxy groups. Among these, preferable are polypropylene glycol, polypropylene triol and polypropylene tetraol from the viewpoints of the economic efficiency and handling easiness.

As the composite metal cyanide complex usable in the present invention, complexes containing zinc hexacyanocobaltate as main component are preferable from the view point of the polymerization activity, among which the ether and/or alcohol complexes are preferable from the viewpoint of the polymerization control. For the purpose of obtaining a polymer having a narrower molecular weight distribution, ethylene glycol dimethyl ether (glyme) and diethylene glycol dimethyl ether (diglyme) are preferable as ethers, and t-butanol is preferable as an alcohol.

The used amount of a composite metal cyanide complex is preferably 0.0001 to 0.03 wt % in terms of the content thereof in the final polyoxyalkylene compound, and more preferably 0.001 to 0.01 wt % from the viewpoint of the reactivity. When the content is less than 0.0001 wt %, unpreferably no sufficient reaction rate is attained, while when the content exceeds 0.03 wt %, unpreferably the production cost of the oxyalkylene polymer is increased.

As the cesium compound usable in the present invention, from the viewpoint of the polymerization reactivity, preferable is a compound having as main component an item selected from the group consisting of metallic cesium; cesium alkoxide such as cesium methoxide, cesium ethoxide and cesium propoxide; and cesium hydroxide and cesium carbonate. Cesium hydroxide is more preferable from the viewpoints of the availability and the economic efficiency.

The used amount of a cesium-based catalyst is preferably 0.05 to 1.5 wt % in terms of the content of metallic cesium in the final polyoxyalkylene compound, and from the viewpoint of the reactivity, more preferably 0.1 to 1.0 wt %. When the content is less than 0.05 wt %, unpreferably no sufficient reaction rate is attained, while when the content exceeds 1.5 wt %, unpreferably the production cost of the oxyalkylene polymer is increased.

A preferable form of the P=N bond-containing compound usable in the present invention may include at least one compound selected from the group consisting of phosphazenium compounds, phosphineoxide compounds and phosphazene compounds.

As phosphazenium compounds, there may be cited the compounds described in Japanese Patent Laid-Open No. 11-106500. Examples of such compounds may include:
tetrakis[tris(dimethylamino)phosphoranylidenamino]phosphonium hydroxide,
tetrakis[tris(dimethylamino)phosphoranylidenamino]phosphonium methoxide, tetrakis[tris(dimethylamino)phosphoranylidenamino]phosphonium ethoxide and
tetrakis[tri(pyrrolidin-1-yl)phosphoranylidenamino]phosphonium tert-butoxide.

As phosphazene compounds, there may be cited the compounds described in Japanese Patent Laid-Open No. 10-36499. Examples of such compounds may include:
1-tert-butyl-2,2,2-tris(dimethylamino)phosphazene,
1-(1,1,3,3-tetramethylbutyl)-2,2,2-tris(dimethylamino) phosphazene,
1-ethyl-2,2,4,4,4-pentakis(dimethylamino)-2λ5,4λ5-catenadi(phosphazene),
1-tert-butyl-4,4,4-tris(dimethylamino)-2,2-bis[tris(dimethylamino)phosphoranylidenamino]-2λ5,4λ5-catenadi (phosphazene),
1-(1,1,3,3-tetramethylbutyl)-4,4,4-tris(dimethylamino)-2,2-bis[tris(dimethylamino)phosphoranylidenamino]-2
1-tert-butyl-2,2,2-tri(1-pyrrolidinyl)phosphazene and
7-ethyl-5,11-dimethyl-1,5,7,11-tetraaza-6λ5-phosphaspiro [5,5]undeca-1(6)-ene.

As phosphine oxide compounds, there may be cited the compounds described in Japanese Patent Laid-Open No. 11-302371. Examples of such compounds may include:
tris[tris(dimethylamino)phosphoranylidenamino]phosphineoxide and
tris[tris(diethylamino)phosphoranylidenamino]phosphineoxide.

Among these, from the viewpoints of industrial applications, phosphazenium compounds and phosphine oxide compounds are preferable.

The used amount of a P=N bond-containing compound is preferably such that the P=N bond-containing compound is contained in a content of $1\times10^{-4}$ to $5\times10^{-1}$ mol in relation to 1 mol of the active hydrogen compound in the initiator. When the content is less than $1\times10^{-4}$ mol, unpreferably no sufficient reaction rate is attained, while when the content exceeds $5\times10^{-1}$ mol, unpreferably the production cost of the polyoxyalkylene compound is increased.

As for the proportion between the reactive modifier and the oxyalkylene polymer in the curable composition of the present invention, the amount of the reactive modifier is set preferably within a range from 5 to 5000 parts (by weight, and the same hereinafter) in relation to 100 parts of the oxyalkylene polymer because such a range provides a remarkable effect in improving the properties of the oxyalkylene polymer, and more preferably within a range from 5 to 2000 parts, the amount of the reactive modifier being usually selected according to the intended applications and performances.

In the composition of the present invention, a curing accelerator may be used, no particular constraint being imposed on the type of the curing accelerator. However, specific examples of the curing catalysts may include tin catalysts, non-tin metal catalysts and basic compounds. Examples of the tin catalysts may include: divalent tin carboxylates such as tin octylate, tin oleate and tin stearate; dibutyltin dicarboxylates such as dibutyltin dilaurate and dibutyltin bis(alkylmaleate); dialkyltin alkoxide derivatives such as dibutyltin dimethoxide and dibutyltin diphenoxide; intramolecular coordinative derivatives of dialkyltin such as dibutyltin diacetylacetonate and dibutyltin acetoacetate; reaction mixtures between dibutyltin oxide and ester compounds, reaction mixtures between dibutyltin oxide and silicate compounds, and derivatives of tetravalent dialkyltin oxides such as oxy derivatives of these dialkyltin oxide derivatives. Examples of the non-tin metal catalysts may include: metal carboxylates containing, as carboxylic acid components, octylic acid, oleic acid, naphtenic acid or stearic acid, such as calcium carboxylates, zirconium carboxylates, iron carboxylates, vanadium carboxylates, bismuth carboxylates, lead carboxylates, titanium carboxylates and nickel carboxylates; titanium alkoxides such as tetraisopropyl titanate, tetrabutyl titanate, tetramethyl titanate and tetra(2-ethylhexyl titanate); aluminum alkoxides such as aluminum isopropylate, mono-sec-butoxy aluminum diisopropylate and aluminum sec-butylate; zirconium alkoxides such as zirconium n-propylate and zirconium n-butylate; titanium chelates such as titanium tetraacetylacetonate, titanium ethylacetoacetate, octylene glycolate and titanium lactate; aluminum chelates such as aluminum trisacetylacetonate, aluminum trisethylacetoacetate, diisopropoxy aluminium ethylacetoacetate; and zirconium chelates such as zirconium tetraacetylacetonate, zirconium monoacetylacetonate, zirconium bisacetylacetonate, zirconium acetylacetonate bisethylacetoacetate and zirconium acetate. Examples of the basic compounds may include: amines, amine salts, quaternary ammonium salts and guanidine compounds.

These may be used each alone or as admixtures thereof. These curing catalysts are used in an amount of about 0.1 to 10 parts by weight in relation to 100 parts by weight of the hydrolyzable silyl group-containing oxyalkylene polymer. When the used amount of the curing accelerator(s) is too small, sometimes the curing rate becomes slow, and in some cases, the curing reaction hardly tends to proceed to a sufficient extent. On the other hand, when the used amount of the curing accelerator(s) is too large, local heat evolution or local foaming unpreferably occurs at the time of curing to make it difficult to obtain satisfactory cured articles.

When the curable composition of the present invention is used, there may be optionally used fillers including reinforcing fillers such as fumed silica, precipitated silica, silicic anhydride, hydrous silicic acid and carbon black; fillers such as calcium carbonate, magnesium carbonate, diatomite, calcined clay, clay, talc, titanium oxide, bentonite, organic bentonite, ferric oxide, zinc oxide, active zinc white, hydrogenated castor oil and shirasu balloon; and fibrous fillers such as asbestos, glass fiber and glass filament. When a curable composition having a high strength is desired to be obtained, preferable results are obtained when a filler selected from the group consisting of fumed silica, precipitated silica, silicic anhydride, hydrous silic acid, carbon black, surface treated fine calcium carbonate, calcined clay, clay and active zinc white and the like is mainly used within a range from 1 to 100 parts by weight in relation to 100 parts by weight of the hydrolyzable silyl group-containing oxypropylene polymer. Also, when a curable composition having a low strength and a large elongation is desired to be obtained, preferable results are obtained when a filler selected from the group consisting of titanium oxide, calcium carbonate, magnesium carbonate, talc, ferric oxide, zinc oxide and shirasu balloon and the like is mainly used within a range from 5 to 200 parts by weight in relation to 100 parts by weight of the hydrolyzable silyl group-containing oxypropylene polymer. Needless to say, these fillers maybe used each alone or as admixtures of two or more thereof.

The use of a plasticizer, in combination with a filler, in the curable composition of the present invention is more effective because the elongation of the cured articles is made thereby larger and the amount of a filler or fillers mixed in the curable composition can be thereby made larger. As such a plasticizer, the following compounds may be optionally used each alone or as admixtures of two or more thereof: phthalates such as dioctyl phthalate, dibutyl phthalate and butyl benzyl phthalate; aliphatic dibasic acid esters such as dioctyl adipate, isodecyl succinate and dibutyl sebacate; glycol esters such as diethylene glycol dibenzoate and pentaerythritol ester; alphatic esters such as butyl oleate and methyl acetylricinoleate; phosphates such as tricresyl phosphate, trioctyl phosphate and octyl diphenyl phosphate; epoxy plasticizers such as epoxidized soy-bean oil, epoxidized flaxseed oil and benzyl epoxystearate; polyester plasticizers such as polyesters between dibasic acids and dihydric alcohols; polyethers such as polypropylene glycol and derivatives thereof; polystyrenes such as poly-α-methylstyrene and polystyrene; and polybutadiene, butadiene/acrylonitrile copolymer, polychloroprene, polyisoprene, polybutene and chlorinated paraffins. Preferable results are obtained when the amount of a plasticizer or plasticizers used falls within a range from 0 to 100 parts by weight in relation to 100 parts by weight of the hydrolyzable silyl group-containing oxypropylene polymer.

According to need, there may also be optionally added various additives such as adhesion improvers, physical property adjusters, storage stability improvers, antiaging agents, ultraviolet absorbers, metal deactivators, antiozonants, photostabilizers, amine-based radical chain inhibitors, phosphorus-based peroxide decomposers, lubricants, pigments and foaming agents. No particular constraint is imposed on the preparation method of the curable composition of the present invention; thus, there may be adopted common methods in which, for example, the above described ingredients are compounded and the mixture thus obtained is kneaded at room temperature or under heating with a mixer, roll, kneader or the like, or the mixture is dissolved by use of a small amount of an appropriate solvent to mix the ingredients therein. Appropriate combinations of these ingredients permit preparing a one-component composition or a two-component composition to be applied.

The curable composition of the present invention forms three dimensional network structure by the action of moisture when exposed to the atmosphere, to be cured into a solid article having rubber-like elasticity. The curable composition of the present invention is particularly useful as an elastic sealant, and may be used as sealants for buildings, ships, vehicles, roads and the like. Also, the curable composition concerned can adhere, alone or with the aid of primers, to a wide range of substrates such as glass, porcelain, wood, metals and molded resin articles, so that it can be used as various types of sealing compositions and adhesive compositions. It can be used as adhesives such as one-component adhesives, two-component adhesives, contact adhesives to adhere after an open time and tackifiers; it is also useful as coating materials, water proof coated films, food packaging materials, cast rubber materials, molding materials and foaming materials.

EXAMPLES

For the purpose of more clearly describing the present invention, description will be made below with reference to specific examples, but the present invention is not limited to these examples. Here, it may be noted that the hydrolyzable silyl group-containing monomers (A) are as follows:

Y9910: γ-Methacryloxypropylmethyldimethoxysilane (manufactured by Japan Unicar Co., Ltd.)

A-174: γ-Methacryloxypropyltrimethoxysilane

Preparation Example 1

Propylene oxide was polymerized by use of a polyoxypropylene glycol having a molecular weight of about 2000 as initiator and a zinc hexacyanocobaltate-glyme complex catalyst, toyieldapolyoxypropyleneglycol (namely, ahydroxy group-terminated polyether oligomer) having an average molecular weight of 10,000 as measured by a terminal group analysis. Then, there was added a methanol solution of 1.2 equivalents of NaOMe in relation to the hydroxy groups of this hydroxy group-terminated polyether oligomer, and then the methanol was distilled off. There was further added 3-chloro-1-propene to convert the terminal hydroxy groups into allyl groups. Then, 10 g of hexane was added to 500 g of the obtained oligomer, and azeotropic dehydration was carried out at 90° C., the hexane was distilled off under reduced pressure, and purging with nitrogen was effected. To the thus treated oligomer, 30 µl of platinum-divinyldisiloxane complex (an isopropanol solution of 3 wt % in terms of platinum) was added, and to the reaction mixture thus obtained, 9.0 g of DMS (dimethoxymethylsilane) was slowly added dropwise under stirring. After allowing the mixed solution to react at 90° C. for 2 hours, the unreacted DMS was distilled off under reduced pressure to yield a hydrolyzable silyl group-containing polyoxypropylene polymer. On the basis of $^1$H-NMR analysis, it was revealed that the introduction proportion of the hydrolyzable silyl groups into the terminals of the obtained polymer was 77% (Polymer A). The number average molecular weight (Mn) and the Mw/Mn value of the obtained polymer were about 15,000 and 1.1, respectively.

Preparation Example 2

Propylene oxide was polymerized by use of a polyoxypropylene diol (Actocole P-23 manufactured by Mitsui Takeda Chemicals, Inc.) having a number average molecular weight of 4000 as measured by GPC as initiator and a zinc hexacyanocobaltate complex as catalyst to yield a polyoxypropylene diol having a number average molecular weight of 30000 as measured by GPC. To 1000 g of the obtained polyoxypropylene diol, 19.7 g of a 28% methanol solution of sodium methylate was added, and thereafter the methanol was distilled off at 130° C. under stirring under a reduced pressure generated by a vacuum pump. Then, 9.4 g of allyl chloride was added, and the reaction mixture was stirred for 30 minutes. Then, the remaining ally chloride was removed under a reduced pressure generated by a vacuum pump. To the reaction mixture, 9.6 g of a 28% methanol solution of sodium methylate was added, and then the methanol was distilled off at 130° C. under stirring under a reduced pressure generated by a vacuum pump. Subsequently, 6.3 g of ally chloride was added, the reaction mixture thus obtained was stirred for 4 hours, and then the remaining ally chloride was removed under a reduced pressure generated by a vacuum pump, to yield a crude, unsaturated group-terminated organic polymer. The obtained organic polymer was dissolved in hexane, then the hexane solution was mixed with water to undergo desalting purification, and then water was removed and hexane was evaporated to yield a pale yellow, transparent unsaturated group-terminated organic polymer. To the obtained pale yellow, transparent unsaturated group-terminated organic polymer, 10.2 g of methyldimethoxysilane and 0.06 g of an isopropanol solution of chloroplatinic acid was added as catalyst, and the reaction mixture thus obtained was stirred at 90° C. for 2 hours, to yield ahydrolyzablesilicon group-terminated organic polymer. The number average molecular weight (Mn) and the Mw/Mn value of the obtained polymer were about 30000 and 1.2, respectively, as measured by GPC.

Synthesis Examples 1 to 9

In each of Synthesis Examples 1 to 9, a toluene solution in which monomers (each having a polymerizable vinyl group) shown in Table 1 and 2,2'-azobis(2-methylbutylonitrile) (trade name: V-59, manufactured by Wako Pure Chemical Industries, Ltd.) (polymerization initiator) were dissolved in the amounts respectively specified in Table 1 was added dropwise to toluene heated to 105° C. over a period of 4 hours, and then polymerization was further allowed to proceed for 2 hours; thus the synthesis products 1 to 9 were obtained. The used amounts of the respective ingredients shown in Table 1 are given in parts by weight. The molecular weights of the obtained synthesis products were measured by GPC.

Synthesis Examples 10 to 17

In each of Synthesis Examples 10 to 17, a toluene solution in which monomers (each having a polymerizable vinyl group) shown in Table 2 and 2,2'-azobis(2-methylbutylonitrile) (trade name: V-59, manufactured by Wako Pure Chemical Industries, Ltd.) (polymerization initiator) were dissolved in the amounts respectively specified in Table 2 was added dropwise to toluene heated to 105° C. over a period of 4 hours, and then polymerization was further allowed to proceed for 2 hours; thus the synthesis products 10 to 17 were obtained. The used amounts of the respective ingredients shown in Table 2 are given in parts by weight. The molecular weights of the obtained synthesis products were measured by GPC.

Examples 1 to 8

The synthesis products 1 to 8 respectively obtained in above Synthesis Examples 1 to 8 each were mixed with Polymer A obtained in Preparation Example 1 in a solid content weight ratio of 40:60, and then the toluene was distilled off at 120° C. under reduced pressure, to yield the polymers of Examples 1 to 8.

Example 9

The synthesis product 9 obtained in above Synthesis Example 9 was mixed with Polymer B obtained in Preparation Example 2 in a solid content weight ratio of 40:60, and then the toluene was distilled off at 120° C. under reduced pressure, to yield the polymer of Example 9.

Comparative Examples 1 to 8

The synthesis products 1 to 8 respectively obtained in above Synthesis Examples 10 to 17 each were mixed with Polymer A obtained in Preparation Example 1 in a solid content weight ratio of 40:60, and then the toluene was distilled off at 120° C. under reduced pressure, to yield the polymers of Comparative Examples 1 to 8.

The polymers thus obtained were allowed to stand under a condition of 5° C. for 30 days, and then the conditions of each of the polymers were visually checked. The obtained polymers satisfactory in storage stability were mixed with the following ingredients to yield curable compositions: 150 parts by weight of a surface treated calcium carbonate (Hakuenka CCR: Shiraishi Kogyo), 20 parts by weight of ground calcium carbonate (Nanox 25A: Maruo Calcium), 10 parts by weight of titanium oxide (Tipaque R-820: Ishihara Sangyo), 60 parts by weight of PPG (polypropylene glycol) having a number average molecular weight of 3,000 as plasticizer, 2 parts by weight of an antisagging agent (Disparlon #6500: Kusumoto Chemicals), 1 part by weight of an ultraviolet absorber (Tinuvin 213: Ciba Specialty Chemicals), 1 part by weight of photostabilizer (Sanol LS770: Sankyo), 2 parts by weight of a dehydrating agent (A-171: Japan Unicar), 2 parts by weight of an adhesion-imparting agent (A-1120: Japan Unicar), and 2 parts by weight of a curing catalyst (Neostann U-220: Nitto Kasei) The obtained curable compositions each were spread into a 3 mm thick sheet, and the sheets thus obtained were allowed to stand at 23° C. for 3 days, and thereafter heated at 50° C. for 4 days to yield blended material sheets, which were subjected to weather resistance evaluation by means of a sunshine weatherometer. The results obtained are shown in Tables 3 and 4.

Here, it is to be noted that the abbreviations for the monomers in Tables 1 and 2 are as follows:
MMA: Methyl methacrylate
BA: Butyl acrylate
2-EHA: 2-Ethylhexyl acrylate
ANO: n-Octyl acrylate
AIO: Isooctyl acrylate
AIN: Isononyl acrylate
SMA: Stearyl methacrylate
LMA: Lauryl methacrylate

TABLE 1

| | | No. of C atoms in alkyl chain | Condition of monomer | Syn. Ex. 1 | Syn. Ex. 2 | Syn. Ex. 3 | Syn. Ex. 4 | Syn. Ex. 5 | Syn. Ex. 6 | Syn. Ex. 7 | Syn. Ex. 8 | Syn. Ex. 9 |
|---|---|---|---|---|---|---|---|---|---|---|---|---|
| Acrylic monomers | MMA | 1 | liquid | 15 | 45 | 15 | 15 | 15 | 15 | 15 | 15 | 15 |
| | BA | 4 | liquid | 40 | 25 | 40 | 40 | 40 | 40 | 40 | 41.5 | 41.5 |
| | 2-EHA | 8 | liquid | 40 | 25 | | | | | | | |
| | ANO | 8 | liquid | | | 40 | | | | | | 41.5 |
| | AIO | 8 | liquid | | | | 40 | | | | | |
| | AIN | 9 | liquid | | | | | 40 | 40 | 40 | 41.5 | |
| | SMA | 18 | solid | | | | | | | | | |
| | LMA | 12 | solid | | | | | | | | | |
| Reactive silyl group containing monomers | Y-9910 | — | liquid | 5 | 5 | 5 | 5 | 5 | 5 | | 2 | 2 |
| | A-174 | — | liquid | | | | | | | 5 | | |

TABLE 1-continued

|  |  | No. of C atoms in alkyl chain | Condition of monomer | Syn. Ex. 1 | Syn. Ex. 2 | Syn. Ex. 3 | Syn. Ex. 4 | Syn. Ex. 5 | Syn. Ex. 6 | Syn. Ex. 7 | Syn. Ex. 8 | Syn. Ex. 9 |
|---|---|---|---|---|---|---|---|---|---|---|---|---|
| Polymerization initiator | V-59 | — | — | 2.0 | 2.0 | 2.0 | 2.0 | 2.0 | 2.0 | 1.4 | 0.5 | 0.5 |
| Mol. wt | GPC-Mn | — | — | 8800 | 9500 | 8700 | 9000 | 8900 | 8900 | 13000 | 19400 | 19200 |

TABLE 2

|  |  | No. of C atoms in alkyl chain | Condition of monomer | Syn. Ex. 10 | Syn. Ex. 11 | Syn. Ex. 12 | Syn. Ex. 13 | Syn. Ex. 14 | Syn. Ex. 15 | Syn. Ex. 16 | Syn. Ex. 17 |
|---|---|---|---|---|---|---|---|---|---|---|---|
| Acrylic monomers | MMA | 1 | liquid |  | 20 | 20 |  | 15 | 15 | 15 | 15 |
|  | BA | 4 | liquid | 47.5 |  | 80 | 20 | 60 | 60 | 60 | 20 |
|  | 2-EHA | 8 | liquid | 47.5 | 80 |  | 80 |  |  | 20 | 60 |
|  | ANO | 8 | liquid |  |  |  |  |  |  |  |  |
|  | AIO | 8 | liquid |  |  |  |  |  |  |  |  |
|  | AIN | 9 | liquid |  |  |  |  |  |  |  |  |
|  | SMA | 18 | solid |  |  |  |  | 20 |  |  |  |
|  | LMA | 12 | solid |  |  |  |  |  | 20 |  |  |
| Reactive silyl group containing monomers | Y-9910 | — | liquid | 5 | 5 | 5 | 5 | 5 | 5 | 5 | 5 |
|  | A-174 | — | liquid |  |  |  |  |  |  |  |  |
| Polymerization initiator | V-59 | — | — | 2.0 | 2.0 | 2.0 | 2.0 | 2.0 | 2.0 | 2.0 | 2.0 |
| Mol. wt | GPC-Mn | — | — | 8800 | 9000 | 9400 | 9000 | 9200 | 8900 | 8800 | 8800 |

TABLE 3

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Reactive modifiers | Polym. 1 | 40 |  |  |  |  |  |  |  |  |
|  | Polym. 2 |  | 40 |  |  |  |  |  |  |  |
|  | Polym. 3 |  |  | 40 |  |  |  |  |  |  |
|  | Polym. 4 |  |  |  | 40 |  |  |  |  |  |
|  | Polym. 5 |  |  |  |  | 40 |  |  |  |  |
|  | Polym. 6 |  |  |  |  |  | 40 |  |  |  |
|  | Polym. 7 |  |  |  |  |  |  | 40 |  |  |
|  | Polym. 8 |  |  |  |  |  |  |  | 40 |  |
|  | Polym. 9 |  |  |  |  |  |  |  |  | 40 |
| Reactive silyl group terminated polypropylene oxide | Polym. A | 60 | 60 | 60 | 60 | 60 | 60 | 60 |  | 60 |
|  | Polym. B |  |  |  |  |  |  |  | 60 |  |
| Storage stability *1 |  | G | G | G | G | G | G | G | G | G |
| Weather resistance *2 |  | G | G | G | G | G | G | G | G | G |

*1: G Transparent liquid; P Precipitation.
*2: G No cracking after 2000 hours; P Cracking after 2000 hours.

TABLE 4

|  |  | Comp. ex. 1 | Comp. ex. 2 | Comp. ex. 3 | Comp. ex. 4 | Comp. ex. 5 | Comp. ex. 6 | Comp. ex. 7 | Comp. ex. 8 | Ref. ex. |
|---|---|---|---|---|---|---|---|---|---|---|
|  | Polym. 10 | 40 |  |  |  |  |  |  |  |  |
|  | Polym. 11 |  | 40 |  |  |  |  |  |  |  |
|  | Polym. 12 |  |  | 40 |  |  |  |  |  |  |
|  | Polym. 13 |  |  |  | 40 |  |  |  |  |  |
|  | Polym. 14 |  |  |  |  | 40 |  |  |  |  |
|  | Polym. 15 |  |  |  |  |  | 40 |  |  |  |
|  | Polym. 16 |  |  |  |  |  |  | 40 |  |  |
|  | Polym. 17 |  |  |  |  |  |  |  | 40 |  |
| Reactive silyl group terminated polypropylene oxide | Polym. A | 60 | 60 | 60 | 60 |  | 60 | 60 |  | 100 |
|  | Polym. B |  |  |  |  | 60 |  |  | 60 |  |
| Storage stability *1 |  | P | P | P | P | G | G | P | P | G |
| Weather resistance *2 |  | — | — | — | — | G | G | — | — | P |

*1: G Transparent liquid; P Precipitation.
*2: G No cracking after 2000 hours; P Cracking after 2000 hours.

INDUSTRIAL APPLICABILITY

The reactive modifier of the present invention is inexpensive in the raw materials used, easy to handle, and satisfactory in storage stability, and is characterized in that when it is used as a modifier, transparent compositions tend to be obtained because it is satisfactory in compatibility.

The invention claimed is:

1. A room temperature curable resin composition which comprises a hydrolyzable silyl group-containing oxyalkylene polymer, a reactive modifier and a curing accelerator,
    wherein the reactive modifier is a hydrolyzable silicon group-containing acrylic polymer having a number average molecular weight of 5000 or more, obtained by copolymerizing the following monomer components (A) to (D): (A) at least one monomer selected from the group consisting of a hydrolyzable silyl group-containing monomer and a monomer having a functional group capable of undergoing introduction of a hydrolyzable silyl group, (B) methyl methacrylate, (C) butyl acrylate and (D) an alkyl (meth)acrylate in which the alkyl chain has 7 to 9 carbon atoms to obtain a copolymer, wherein:
    in the reactive modifier, the content of the component (A) is 0.01 to 10 parts by weight, the content of the component (B) is 5 to 95 parts by weight, the content of the component (C) is 5 to 95 parts by weight, the content of the component (D) is 5 to 95 parts by weight, the total content of the components (A) to (D) is 50 to 100 parts by weight and the weight ratio of the component (C) to the component (D) is 0.5 to 2.0, and
    wherein when component (A) is a monomer having a functional group capable of undergoing introduction of a hydrolyzable silyl group, the copolymer is reacted with a compound having a hydrolyzable silyl group to obtain the acrylic polymer.

2. The room temperature curable resin composition according to claim 1, in which component (A) is a hydrolyzable silyl group-containing monomer.

3. The room temperature curable resin composition according to claim 1, in which component (A) is a monomer having a functional group capable of undergoing introduction of a hydrolyzable silyl group.

* * * * *